(12) United States Patent
Turner et al.

(10) Patent No.: US 6,870,460 B2
(45) Date of Patent: Mar. 22, 2005

(54) INPUT IMPEDANCE ARRANGEMENT FOR RF TRANSPONDER

(75) Inventors: Christopher Gordon Gervase Turner, Gauteng (ZA); John McMurray, Gauteng (ZA)

(73) Assignee: Supersensor (Proprietary) Limited, Gauteng (ZA)

( * ) Notice: Subject to any disclaimer, the term of this patent is extended or adjusted under 35 U.S.C. 154(b) by 6 days.

(21) Appl. No.: 09/996,937

(22) Filed: Nov. 30, 2001

(65) Prior Publication Data

US 2003/0025591 A1 Feb. 6, 2003

(30) Foreign Application Priority Data

Nov. 30, 2000 (ZA) .......................................... 2000/7062

(51) Int. Cl.[7] .............................................. H04Q 5/22
(52) U.S. Cl. ................ 340/10.1; 340/572.7; 340/572.5; 340/310.05; 340/10.51; 340/10.4; 343/870; 343/861
(58) Field of Search ............................ 340/10.1, 572.7, 340/572.1, 333, 310.05, 10.51, 10.4, 10.5, 572.5; 343/860, 870, 822, 852, 861; 375/315; 367/152

(56) References Cited

U.S. PATENT DOCUMENTS

| 4,786,907 A | 11/1988 | Koelle .......................... 342/51 |
| 5,280,633 A | 1/1994 | Camiade et al. ............... 455/79 |
| 5,311,186 A | 5/1994 | Utsu et al. ..................... 342/51 |
| 6,147,606 A | * 11/2000 | Duan ....................... 340/572.7 |
| 6,621,467 B1 | * 9/2003 | Marsh .......................... 343/850 |

FOREIGN PATENT DOCUMENTS

| EP | 0 254 954 A1 | 2/1988 |
| EP | 0 324 564 A2 | 7/1989 |
| EP | 0 420 180 A1 | 4/1991 |
| EP | 0 449 720 A1 | 10/1991 |
| FR | 2 757 952 | 7/1998 |

* cited by examiner

*Primary Examiner*—Michael Horabik
*Assistant Examiner*—Vernal Brown
(74) *Attorney, Agent, or Firm*—Finnegan, Henderson, Farabow, Garrett & Dunner, L.L.P.

(57) ABSTRACT

A transponder 14.1 for a radio frequency (RF) identification system comprises an antenna 22.1 having an antenna impedance ($Z_A$) having a real part ($R_A$) connected to transponder circuitry presenting a load impedance ($Z_L$) having a real part ($R_L$), a ratio $$\left(\frac{R_L}{R_A}\right)$$

of the real part ($R_L$) of the load impedance and the real part ($R_A$) of the antenna impedance having a first value that is bigger than one when the transponder is not transmitting data. During transmission of data the ratio is switched between the first value and a second smaller value.

9 Claims, 4 Drawing Sheets $Z_A = R_A + jX_A; \quad Z_L = R_L - jX_L$ wherein $R_A = R_L$ and
$X_A = X_L$

INPUT IMPEDANCE ARRANGEMENT FOR RF TRANSPONDER

INTRODUCTION AND BACKGROUND

THIS invention relates to electronic radio frequency (RF) identification systems. It more particularly relates to a transponder forming part of such a system, the system and associated methods of reading transponders and modulating an interrogation signal.

Electronic RF identification systems are well known in the art. Such a system comprises an interrogator or reader and a plurality of transponders. In use, the reader transmits an RF interrogation signal towards the transponders. In some systems, the transponders derive power to energize load circuits from the interrogation or energizing signal, The transponders then generate respective response signals comprising respective identification code data unique to the transponder, by respectively backscatter modulating the energizing signal with the respective identification code data. The reader reads the response signals in sequential manner, thereby to identify and/or count the transponders and/or articles with which they are associated, in use.

Each transponder comprises transponder circuitry presenting a load impedance to an antenna having an antenna impedance. In the known systems, the load impedance and antenna impedance are matched in known manner to yield optimum power transfer to the transponder circuitry, The applicant has found that especially in applications where the antenna apertures of a plurality of transponders overlap, these transponders are required to share the available energy and hence the transponders and the system do not always perform satisfactorily.

In WO 98/29760 in the name of Gemplus S.C.A. there is disclosed a system and transponder which do not utilize backscatter modulation of the interrogation signal and wherein certain transponders in the energizing field are selectively and deliberately detuned to alleviate the aforementioned problems. In other embodiments the impedance of the antenna and load impedance presented by the transponder circuitry are deliberately mismatched. In a preferred form of these embodiments, the load impedance is short-circuited when the transponder is not selected and not transmitting. A method of reading these transponders includes the extra steps of selecting and unselecting at least some of the transponders. Furthermore, the voltage recovery of these transponders when not selected may not be adequate in some applications.

OBJECT OF THE INVENTION

Accordingly, it is an object of the present invention to provide a transponder, identification system and method with which the applicant believes the aforementioned disadvantages may at least be alleviated.

SUMMARY OF THE INVENTION

According to the invention there is provided a transponder of a radio frequency (RF) identification system comprising an antenna having an antenna impedance having a real part ($R_A$) connected to transponder circuitry presenting a load impedance having a real part ($R_L$), a ratio $$\left(\frac{R_L}{R_A}\right)$$

of the real part ($R_L$) of the load impedance and the real part ($R_A$) of the antenna impedance having a first that is bigger than one when the transponder is not transmitting data.

The first value may typically be at least 2, but preferably it is at least 10.

In applications where backscatter modulation is utilized and during transmission of data, the value is switched between the first value and a second smaller value. In Some embodiments, the second value may be bigger then one and in other embodiments it may be smaller than one.

The real part of the antenna impedance is preferably constant during use and may be in the order Of 40 $\Omega$. However, typically, the real part of the antenna impedance is in the order of hundreds of ohms such as at least 400 $\Omega$ and preferably It is at least 600 $\Omega$. The real part of the load impedance is typically in the order of thousands of ohms, preferably in the order of 6000 $\Omega$, while the transponder is not transmitting data.

The invention also includes within its scope an electronic identification system comprising transponders as herein defined and/or described.

Yet further included within the scope of the present invention is a method of reading a plurality of radio frequency transponders each comprising an antenna having an antenna impedance having a real part and a load connected to the antenna, the load having a load impedance having a real part, the method comprising the steps of:

transmitting a radio frequency interrogation signal towards the transponders;

at each transponder, normally causing a ratio of the real part of the load impedance and the real part of the antenna impedance to have a first value of bigger than one; and when transmitting data, causing the ratio to be switched between the first value and a second smaller value In accordance with the data.

Still further included within the scope of the present invention is a method of modulating an impinging radio frequency signal comprising the steps of;

receiving the signal via an antenna having an antenna impedance having a real part;

adjusting a real part of a load impedance connected to the antenna to cause a ratio of the real part of the load impedance and the real part of the antenna impedance to alternate between a first value bigger than 1 and a second smaller value, thereby to backscatter modulate the impinging signal.

BRIEF DESCRIPTION OF THE ACCOMPANYING DIAGRAMS

The invention will now further be described, by way of example only, with reference to the accompanying diagrams wherein.

Figure 6:
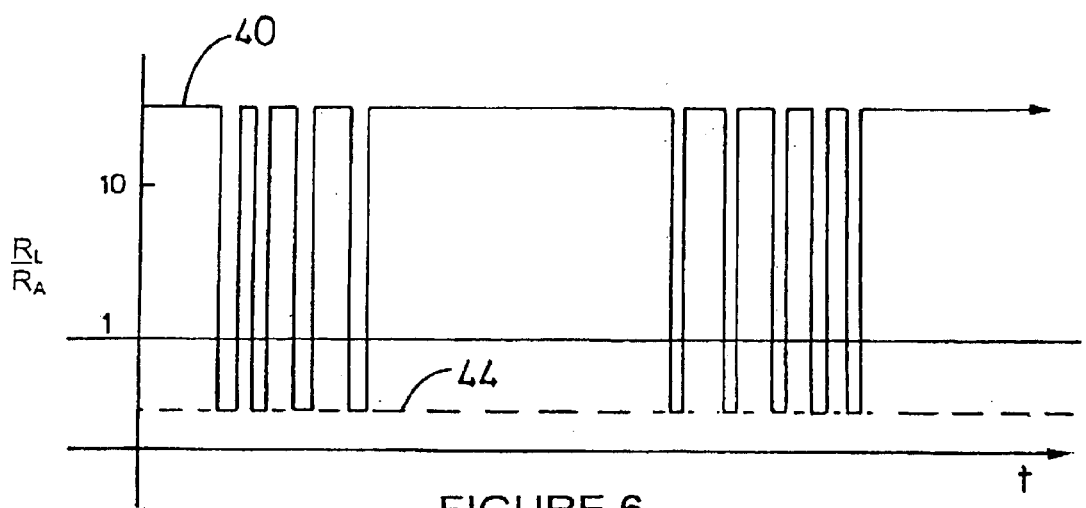

against time in a first embodiment of the transponder, system and method according to the invention; and FIG. 6 is a similar diagram for a second embodiment of the invention.

DESCRIPTION OF A PREFERRED EMBODIMENT OF THE INVENTION

Figure 1:
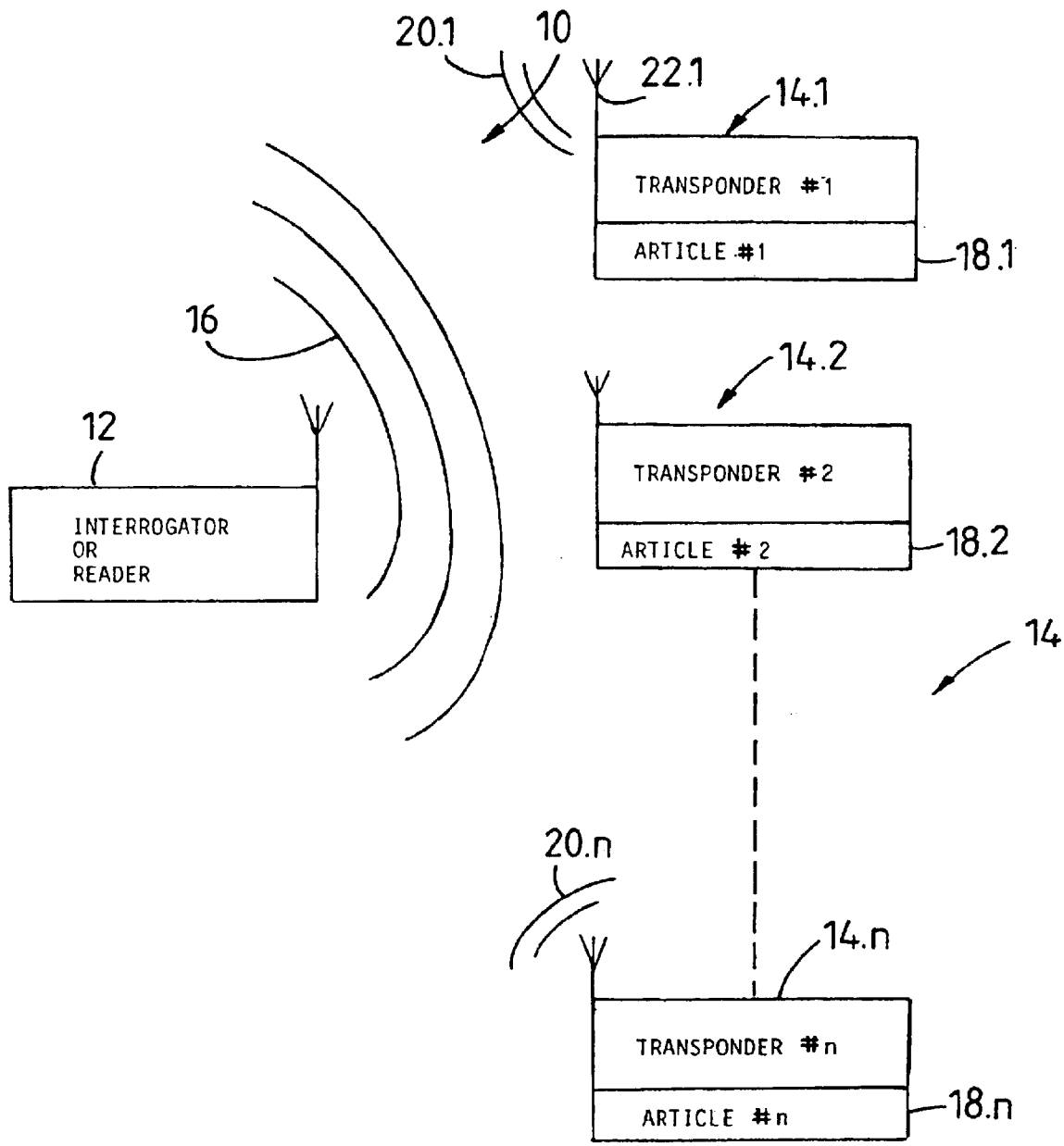
FIG. 1 is a block diagram of an electronic radio frequency identification system.

A known electronic radio frequency (RF) identification system is generally designed by the reference numeral 10 in FIG. 1.

The system 10 comprises a reader or interrogator 12 for transmitting an RF interrogation or energizing signal 16 towards a transponder population 14 comprising transponders 14.1 to 14.n. The transponders are of a kind deriving power from the energizing signal to power local circuits of the transponders. In use, the transponders are mounted on or associated with respective articles 18.1 to 18.n to be identified or counted.

Each transponder when energized as aforesaid, modulates the re-transmitted signal (for example by backscatter modulation of the energizing signal) to generate respective response signals 20.1 to 20.n comprising respective identification code data characteristic of that transponder. The reader 12 reads these response signals in sequential manner to identify the transponders and the articles, or simply to count the articles.

Figure 2:
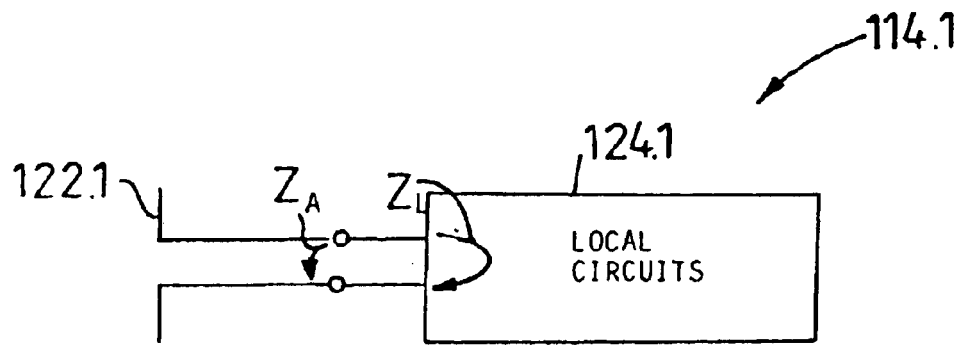
FIG. 2 is a basic block diagram of a prior art transponder forming part of an identification system.

Referring to FIG. 2, known transponder 114.1 comprises an antenna 122.1 having an antenna impedance $Z_A$ having a real part $R_A$ and an inductive imaginary part $X_A$. The antenna is connected to transponder circuitry which is normally integrated in known manner on an integrated chip 124.1. The transponder circuitry presents a load impedance $Z_L$ having a real part $R_L$ and a capacitive imaginary part $X_L$. In the known systems, the parts $X_A$ and $X_L$ are selected to cancel one another at the operating frequency $f_o$ of the system, Furthermore, $R_L$ is selected to be equal to $R_A$. With such an arrangement optimum power, that is 50% of the incident power, is absorbed by the transponder circuitry and 50% is reradiated.

It has been found that with a plurality of transponders 14.1 to 14.n located close to one another, their respective antenna apertures overlap, so that an unnecessary high level of power in the energizing signal is absorbed by some transponders, thereby reducing the available power perhaps to a level below a threshold for at least some of the other transponders. It is also believed that Improved results could be obtained in use, by not optimizing the power absorption by the transponder circuitry, but rather to improve the voltage recovered from the energizing signal over the load impedance. If the power that one transponder absorbs can be reduced, then there is more power available for use by other transponders.

By deliberately mismatching the real part $R_L$ of the transponder circuitry impedance, the operating voltage for the chip may be increased and the power absorbed decreased. More particularly, this is achieved by selecting the real part $R_L$ of the transponder circuitry impedance higher than the real part $R_A$ of the antenna impedance, typically at least two times higher and preferably at least ten times higher.

Figure 3:
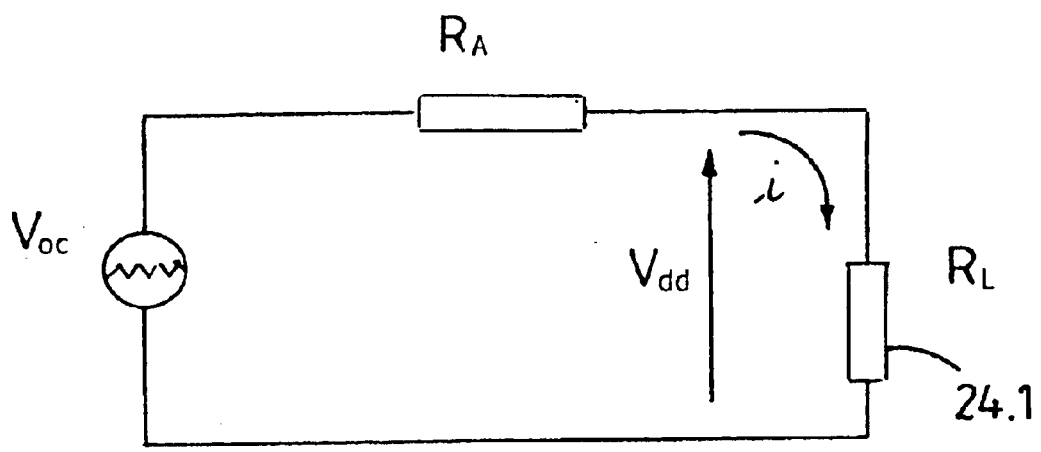
FIG. 3 is an equivalent diagram of a transponder for illustrating the principles underlying the present invention.

This may be illustrated with reference to the following example and FIG. 3. In FIG. 3 there is shown an equivalent circuit of a transponder 14.1 for a case where the imaginary parts of the antenna and load impedances are adjusted so that they cancel out at the operating frequency $f_o$=900 MHz, $\lambda$=0.33 m. Let's assume that the effective radiated power (ERP) from the reader 12 is $P_t$=4W, that the real part $R_A$ of the antenna impedance is 600 Ω and that antenna gain g=1.5.

The power density $P_d$ at a distance d of 2 meters from the reader is given by $$P_d = \frac{P_t}{4\Pi d^2} = 0.08 \text{ Watts per square meter}$$

The antenna aperture $A_e$ for the above halfwave dipole antenna is given by $$A_e = \frac{g\lambda^2}{4\Pi} = 0.0133 \text{ m}$$

The antenna emf $V_{oc}$ is given by the equation $$V_{oc} = \sqrt{4 A_e P_d R_A} = 1.6 \text{V}$$

Current i flowing in the circuit is given by, $$I = \frac{V_{oc}}{R_A + R_L}$$

The voltage $V_{dd}$ over the load or transponder circuitry 24.1 is given by $V_{dd}$=i$R_L$ From the following table it can be seen that for $R_L$=6000 Ω as opposed to the conventional matched 600 Ω, less power $P_a$ is absorbed by the transponder and the recovered voltage $V_{dd}$ is higher.

|  | $R_L$ = 800 Ω | $R_L$ = 6000 Ω |
| --- | --- | --- |
| i | 1.3 mA | 0.242 mA |
| $P_a = i^2 R_L$ | 1060 μW | 353 μW |
| $V_{dd}$ | 0.78 V | 1.455 V |

It will be seen that with $R_L$=6000 Ω the power absorbed $P_a$ is 66% less and the voltage recovered is 87% higher. Thus, there is more energy available for other transponders.

Figure 4:
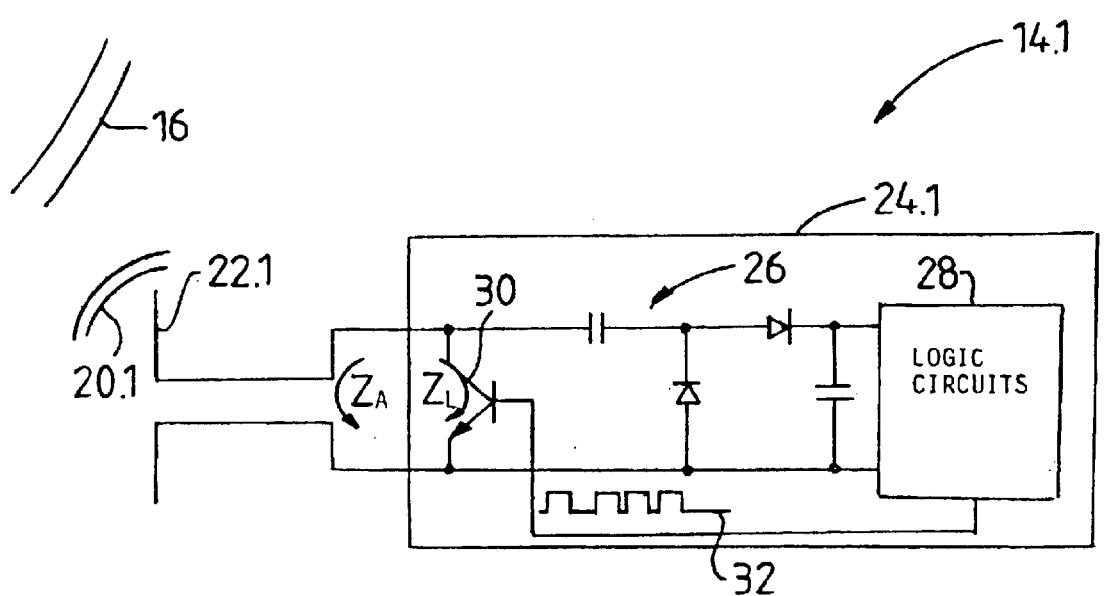
FIG. 4 is a basic block diagram of a transponder according to the invention forming part of an identification system according to the invention.

In FIG. 4 there is shown a more detailed block diagram of the transponder 14.1 according to the invention. The transponder comprises an antenna 22.1 having an antenna impedance with a real part $R_A$ of 600 Ω. The transponder further comprises local transponder circuitry 24.1 comprising a detector 26, logic circuitry 28 including a controller and a modulator 30, The transponder circuitry presents a load impedance $Z_L$. The imaginary parts of the antenna impedance and the load impedance are selected such that they cancel at the operating frequency $f_o$. A real part of the load impedance $R_L$ is selected to be in the order of 6000 Ω.

A data signal 32 generated by the logic circuitry 28 comprises identification code data characteristic of the transponder. In use, the transponder derives energy to power the transponder circuitry from the incident energizing signal 16. The data signal Is utilized to drive the modulator by switching the transistor 30 between normal "off" states when the transistor is open circuit and $R_L$=6000 Ω, and modulated "on" states when the transistor forms a short circuit and when $R_L$<<100 Ω. In both states most of incident energy is reradiated and is hence available for other nearby transponders.

Due to this switching of the modulator 30, the data signal 32 is backscatter modulated on the energizing signal 16 to form a response signal 20.1 carrying the data signal.

Figure 5:
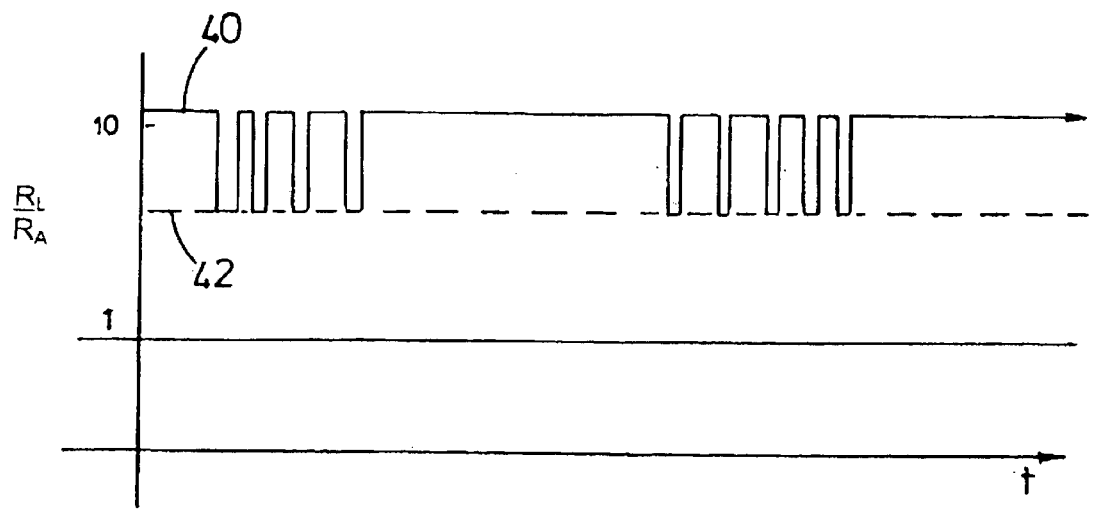
FIG. 5 is a diagram of the relationship of $$\frac{R_L}{R_A}$$

In FIGS. 5 and 6 there are shown diagrams of $$\frac{R_L}{R_A}$$

against time for two embodiments of the transponder according to the invention. In FIG. 5, the ratio of $$\frac{R_L}{R_A}$$

when the transponder is not transmitting has a first value 40 of at least ten (10). During data transmission, the ratio $$\frac{R_L}{R_A}$$

is switched between the aforementioned first value and a second value 42 of more then one (1). In FIG. 6, the ratio of $$\frac{R_L}{R_A}$$

when the transponder is not transmitting has a first value of at least ten (10) and during modulation or data transmission, it is switched between the first value and a second value 44 of less than one (1).

It will be appreciated that there are many variations in detail on the transponder, identification system and method according to the invention without departing from the scope and spirit of the appended claims.

What is claimed is:

1. A transponder for a radio frequency (RF) identification system comprising an antenna having an antenna impedance having a real part ($R_A$) connected to transponder circuitry presenting a load impedance having a real part ($R_L$), a ratio $$\left(\frac{R_L}{R_A}\right)$$

of the real part ($R_L$) of the load impedance and the real part ($R_A$) of the antenna impedance having a first value that is bigger than one, when the transponder is not transmitting data.

2. A transponder as claimed in claim 1 wherein the value is at least ten.

3. A transponder as claimed in claim 1 wherein when the transponder is transmitting data, the ratio is switched between said first value and a second lower value, thereby to back-scatter modulate the data on an impinging interrogation signal.

4. A transponder as claimed in claim 3 wherein the second value is also bigger than one.

5. A transponder as claimed in claim 3 wherein the second value is less than one.

6. A transponder as claimed in claim 1 wherein the real part of the antenna impedance is in the order of hundreds of ohms and the real part of the load impedance is in the order of thousands of ohms when the transponder is not transmitting data.

7. An electronic identification system comprising a transponder as claimed in claim 1.

8. A method of reading a plurality of radio frequency transponders each comprising an antenna having an antenna impedance having a real part and a load connected to the antenna, the load having a load impedance having a real part, the method comprising the steps of:

transmitting a radio frequency interrogation signal towards the transponders;

at each transponder, normally causing a ratio of the real part of the load impedance and the real part of the antenna impedance to have a first value of bigger than one; and when transmitting data, causing the ratio to be switched between the first value and a second smaller value in accordance with the data.

9. A method of modulating an impinging radio frequency signal comprising the steps of:

receiving the signal via an antenna having an antenna impedance having a real part;

adjusting a real part of a load impedance connected to the antenna to cause a ratio of the real part of the load impedance and the real part of the antenna impedance to alternate between a first value bigger than one and a second smaller value, thereby to backscatter modulate the impinging signal.

* * * * *